(12) United States Patent
Lee et al.

(10) Patent No.: US 9,892,305 B2
(45) Date of Patent: Feb. 13, 2018

(54) BIOMETRIC RECOGNITION APPARATUS

(71) Applicant: SUPERC-TOUCH CORPORATION, New Taipei (TW)

(72) Inventors: Hsiang-Yu Lee, New Taipei (TW); Shang Chin, New Taipei (TW); Ping-Tsun Lin, New Taipei (TW)

(73) Assignee: SUPERC-TOUCH CORPORATION, New Taipei (TW)

( * ) Notice: Subject to any disclaimer, the term of this patent is extended or adjusted under 35 U.S.C. 154(b) by 44 days.

(21) Appl. No.: 15/062,657

(22) Filed: Mar. 7, 2016

(65) Prior Publication Data

US 2016/0283769 A1  Sep. 29, 2016

(30) Foreign Application Priority Data

Mar. 25, 2015  (TW) .............................. 104109488 A

(51) Int. Cl.
*G01R 27/26* (2006.01)
*G06F 3/041* (2006.01)
*G06K 9/00* (2006.01)

(52) U.S. Cl.
CPC ....... *G06K 9/00026* (2013.01); *G06K 9/0002* (2013.01)

(58) Field of Classification Search
CPC .................. G06K 9/00026; G06K 9/0002
USPC ........................ 324/658–690; 345/173, 174
See application file for complete search history.

(56) References Cited

U.S. PATENT DOCUMENTS

| 2008/0069413 | A1  | 3/2008  | Riedijk et al. |
|---|---|---|---|
| 2012/0321149 | A1* | 12/2012 | Carver ................. G06K 9/0004 382/124 |
| 2013/0181949 | A1* | 7/2013  | Setlak ..................... G06F 3/042 345/175 |
| 2013/0187871 | A1* | 7/2013  | Kurashima ............. G06F 3/041 345/173 |
| 2014/0241595 | A1  | 8/2014  | Bernstein et al. |

(Continued)

FOREIGN PATENT DOCUMENTS

| CN | 103902971 A | 7/2014 |
|---|---|---|
| CN | 104077575 A | 10/2014 |
| TW | 555959 B | 10/2003 |

(Continued)

OTHER PUBLICATIONS

Office Action dated Sep. 3, 2015 of the corresponding Taiwan patent application.

*Primary Examiner* — Farhana Hoque
(74) *Attorney, Agent, or Firm* — Chun-Ming Shih; HDLS IPR Services

(57) ABSTRACT

A biometric recognition apparatus includes a substrate, a plurality of sensing electrodes, a plurality of traces, at least one shielding electrode, at least one insulating layer, and at least one fingerprint recognition IC. The sensing electrodes are arranged on one side of the substrate with at least one row to detect fingerprint information. Each trace is electrically coupled to at least one sensing electrode. The shielding electrodes are arranged above the traces to avoid the interference from fingers or external noise. The insulating layer is arranged between the shielding electrodes and the traces. The fingerprint recognition IC is connected to the corresponding sensing electrodes to detect the electric charge variations at the sensing electrodes.

20 Claims, 8 Drawing Sheets

(56) References Cited

U.S. PATENT DOCUMENTS

2014/0333328 A1* 11/2014 Nelson .................. G06F 3/044
    324/663

FOREIGN PATENT DOCUMENTS

| TW | 200406713 A | 5/2004 |
| TW | 200525716 A | 8/2005 |
| TW | M491216 U | 12/2014 |

* cited by examiner

BIOMETRIC RECOGNITION APPARATUS

BACKGROUND OF THE INVENTION

Field of the Invention

The present invention relates to a biometric recognition apparatus, especially to biometric recognition apparatus for fingerprint recognition.

Description of Prior Art

Biometric recognition technologies have rapid development due to the strong request from electronic security applications and automatic access control system. The biometric recognition technologies can be classified into fingerprint recognition, iris recognition and DNA recognition and so on. For the considerations of efficiency, safety and non-invasiveness, the fingerprint recognition becomes main stream technology. The fingerprint recognition device can scan fingerprint image by optical scanning, thermal imaging or capacitive imaging. For cost, power-saving, reliability and security concerns, the capacitive fingerprint sensor becomes popular for biometric recognition technology applied to portable electronic devices.

The conventional capacitive fingerprint sensors can be classified into swipe type and area type (pressing type), and the area type has better identification correctness, efficiency and convenience. However, the area type capacitive fingerprint sensor generally integrates the sensing electrodes and the sensing circuit into one integrated circuit (IC) protected by a sapphire film with thickness below 100 um because the sensed signals are minute and the background noise is huge in comparison with the minute sensed signals. As a result, the material cost and package cost is high while the product lifetime and durability are influenced. It is a development trend to enhance the sensing ability and signal-to-noise ratio for the sensing circuit such that the sensing electrodes can be placed on the substrate other than that for integrated circuit (IC). Therefore, the sensing area can be increased while the cost can be decreased. Moreover, the lifetime and durability are enhanced.

The conventional finger-swiping recognition apparatus have following schemes. The sensing electrodes and the sensing circuit are integrated in a single IC. Alternatively, mutual electrodes for capacitance are formed on thin films and packaged in chip on film (COF) architecture to provide mutual capacitance sensor. The former finger-swiping recognition apparatus has higher cost and poor durability. The later finger-swiping recognition apparatus has poor recognition accuracy. It is desirable to provide a biometric recognition apparatus to have low cost and accurate recognition as well as long lifetime.

It is an object of the invention to overcome above-mentioned problems.

In one aspect of the present invention, the biometric recognition apparatus has at least one row of sensing electrodes and has shielding electrode and uses self-capacitance sensing scheme, thus reducing cost and enhancing the recognition accuracy and product lifetime.

SUMMARY OF THE INVENTION

Accordingly, the present invention provides a biometric recognition apparatus, comprising: a substrate; a plurality of sensing electrodes arranged on one side of the substrate and arranged in at least one row to sense fingerprint information of user finger thereon; a plurality of traces, each of the traces electrically coupled to at least one of the sensing electrodes; at least one shielding electrode arranged on one side of the traces to shield the traces from interference of noise; at least one insulating layer arranged between the shielding electrode and the traces, and at least one fingerprint recognition integrated circuit (IC) comprising at least one self-capacitance sensing circuit, the self-capacitance sensing circuit selectively coupled to at least one of the sensing electrodes to sense charge variation or capacitance variation of the selected sensing electrode due to approaching, touching or swiping of user finger.

According to one aspect of the present invention, the biometric recognition apparatus further comprises a positioning electrode to sense an approach, or a position of user finger or a speed or an acceleration of swiped user finger.

According to one aspect of the present invention, the at least one shielding electrode is electrically connected to the at least one fingerprint recognition IC to sense an approach or a position of user finger or to sense a speed or an acceleration of swiped user finger.

According to one aspect of the present invention, the self-capacitance sensing circuit comprises: a differential amplifier having a first input end, a second input end and an output end; a first impedance electrically coupled to the first input end; a second impedance electrically coupled to the second input end and having a same impedance with the first impedance; a first capacitor electrically coupled to the first input end; and an input signal source electrically coupled to a common end of the first impedance and the second impedance for proving an input signal to the first input end and the second input end, wherein at least one of the sensing electrodes is electrically coupled to the second input end to sense a fingerprint information, the differential amplifier outputs a differentially-amplified signal according to the input signal and the sensed fingerprint information.

According to one aspect of the present invention, the at least one fingerprint recognition IC is bonded or press-welded on the substrate and electrically coupled to the sensing electrodes and the at least one shielding electrode.

According to one aspect of the present invention, wherein the at least one fingerprint recognition IC is bonded or press-welded on a flexible printed circuit board is electrically coupled to the sensing electrodes and the at least one shielding electrode through traces on the flexible printed circuit.

According to one aspect of the present invention, the substrate is glass substrate or polymer thin film substrate.

According to one aspect of the present invention, the substrate is metallic substrate.

According to one aspect of the present invention, the metallic substrate is made from stainless steel, aluminum (Al), copper (Cu), iron (Fe), silver (Ag), tin (Sn), tungsten (W) or an alloy of above metals.

According to one aspect of the present invention, the metallic substrate is isolated with the traces by another insulating layer.

According to one aspect of the present invention, the biometric recognition apparatus further comprises a protection layer arranged opposite to the metallic substrate.

According to one aspect of the present invention, the sensing electrodes and the shielding electrode are made from transparent conductive material or opaque conductive material.

According to one aspect of the present invention, the transparent conductive material is indium tin oxide (ITO), zinc tin oxide (ZTO), zinc oxide (ZnO), gallium zinc oxide (GZO) conductive polymer, carbon nanotube, graphene, or silver film with thickness below 50 nm According to one aspect of the present invention, the opaque conductive material is chromium (Cr), barium (Ba), molybdenum (Mo), aluminum (Al), silver (Ag), copper (Cu), titanium (Ti), nickel (Ni), tantalum (Ta), cobalt (Co), tungsten (W), magnesium (Mg), calcium (Ca), potassium (K), lithium (Li), indium (In), an alloy of above metals, or a composition of lithium fluoride and Al, or a composition of magnesium fluoride and Al, or a composition of lithium oxide and Al.

According to one aspect of the present invention, wherein the sensing electrodes are of triangular, rectangle, square, rhombic, circular or polygonal shape.

According to one aspect of the present invention, wherein the sensing electrodes are arranged in at least two rows, one row of sensing electrodes are aligned with another row of sensing electrodes, or staggered with another row of sensing electrodes.

BRIEF DESCRIPTION OF DRAWING

One or more embodiments of the present disclosure are illustrated by way of example and not limitation in the figures of the accompanying drawings, in which like references indicate similar elements. These drawings are not necessarily drawn to scale.

DETAILED DESCRIPTION OF THE INVENTION

Figure 1:
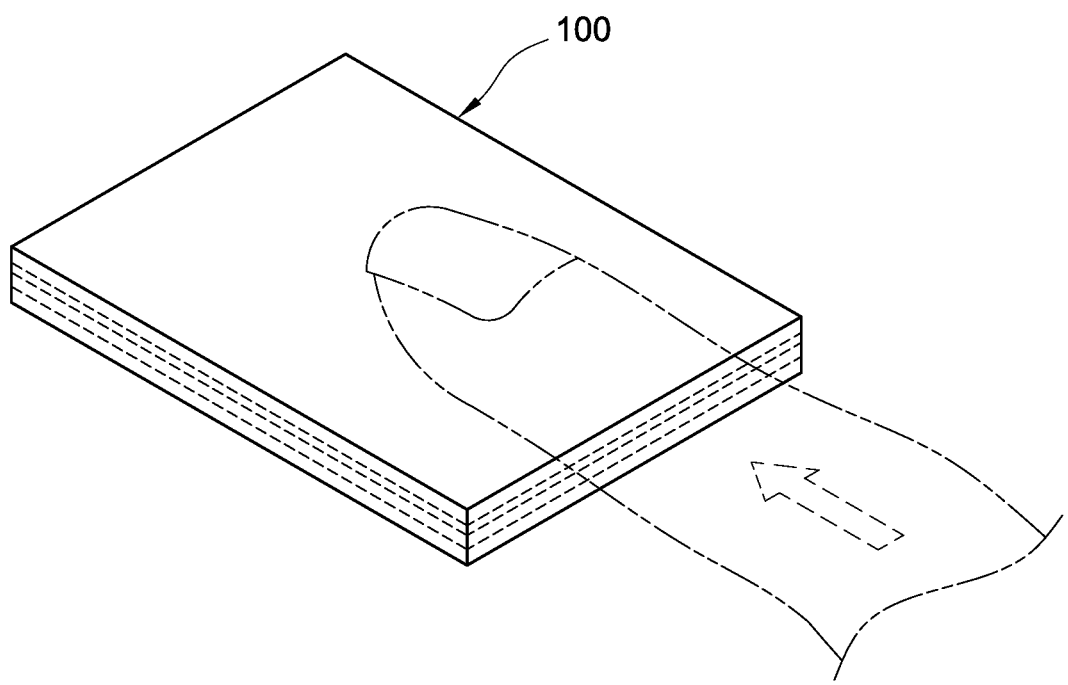
FIG. 1 is a perspective view showing the biometric recognition apparatus of the present invention.

FIG. 1 is a perspective view showing the biometric recognition apparatus of the present invention. The biometric recognition apparatus 100 has layered structure and the sensing electrodes therein can detect fingerprint features by sensing the charge variation (or capacitance variation) caused by the ridges and valleys on the fingerprint as user finger swipes or presses on the biometric recognition apparatus 100. As shown in FIG. 1, the user finger moves on the biometric recognition apparatus 100 along a direction indicated by a dashed arrow sign.

FIGS. 2 to 5 respectively show the schematic views of the biometric recognition apparatus 100 according to the first to fourth embodiments of the present invention. The biometric recognition apparatus 100 comprises a substrate 10, a plurality of sensing electrodes 211~22m, a plurality of traces 311~32m, at least one shielding electrode 41~42, at least one insulating layer (with reference to FIG. 8A) and at least one fingerprint recognition IC 12. The substrate 10 can be made from glass, polymer thin film or metal. The metal can be stainless steel, aluminum (Al), copper (Cu), iron (Fe), silver (Ag), tin (Sn), tungsten (W) or the alloy of above metals. The sensing electrodes and the shielding electrode can be made from transparent conductive material or opaque (non-transparent) conductive material. The transparent conductive material includes indium tin oxide (ITO), zinc tin oxide (ZTO), zinc oxide (ZnO), gallium zinc oxide (GZO) conductive polymer, carbon nanotube, Graphene, or silver film with thickness below 50 nm. The opaque (non-transparent) conductive material can be chromium (Cr), barium (Ba), molybdenum (Mo), aluminum (Al), silver (Ag), copper (Cu), titanium (Ti), nickel (Ni), tantalum (Ta), cobalt (Co), tungsten (W), magnesium (Mg), calcium (Ca), potassium (K), lithium (Li), indium (In), the alloy of above metals, or the composition of lithium fluoride and Al, or the composition of magnesium fluoride and Al, the composition of lithium oxide and Al.

The sensing electrodes 211~22m are arranged on one side of the substrate 10 and arranged at least in one row to sense the features of the fingerprint swiping or pressing on the biometric recognition apparatus 100. Each of the traces 311~322m electrically connects with at least one of the sensing electrodes 211~22m. According to some implementations of the present invention, the at least one shielding electrode 41~42 are such arranged that they are closer to user finger with respect to the traces 311~322m to shield the traces 311~322m from the noise of user finger. The insulating layer is arranged between the at least one shielding electrode 41~42 and the traces 311~322m. The at least one fingerprint recognition IC 12 includes a self-capacitance sensing circuit (with reference to FIG. 7), which is electrically coupled to the corresponding sensing electrodes 211~22m to sense the charge (capacitance) changes due to swipe or pressing of user finger on the biometric recognition apparatus 100. The at least one fingerprint recognition IC 12 is bonded or press-welded to the substrate 10 and electrically coupled to the sensing electrodes 211~22m through the traces 311~322m or electrically coupled to the shielding electrode 41~42 through the other traces 410, 420.

Figure 2:
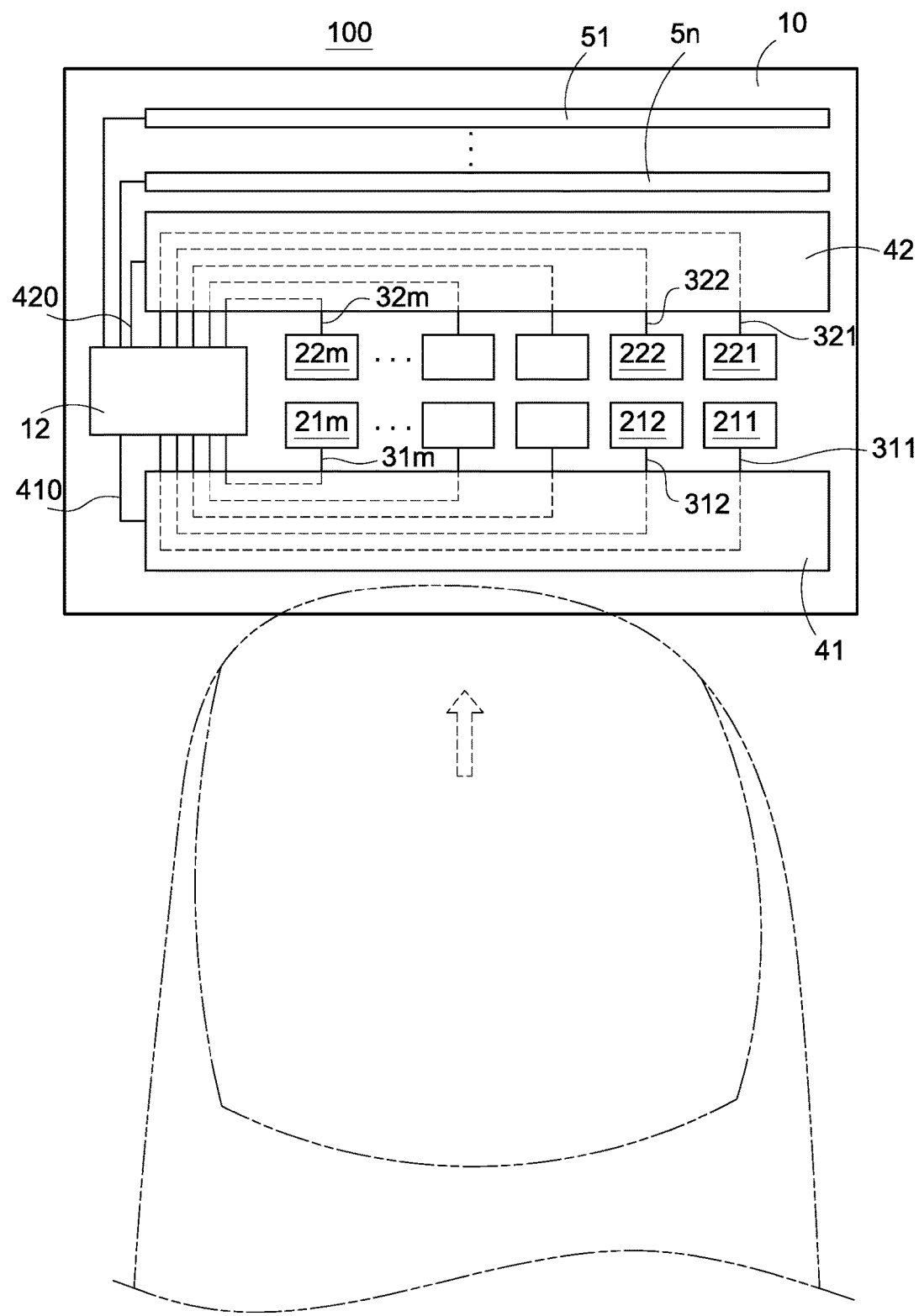
FIGS. 2 to 5 respectively show the schematic views of the biometric recognition apparatus according to the first to fourth embodiments of the present invention.

In the embodiment shown in FIG. 2, the sensing electrodes 211~22m are arranged in two rows, namely, one row of sensing electrodes 211~21m and another row of sensing electrodes 221~22m, where the rows are extended, for example, along the direction vertical to the finger extension direction. It should be noted that multiple row arrangement of the sensing electrodes 211~22m can enhance sensing accuracy and sensing speed. The fingerprint recognition IC 12 is electrically coupled to at least one of the corresponding sensing electrodes 211~22m through traces 311~322m. More particularly, the biometric recognition apparatus 100 further comprises a plurality of selection switches and the fingerprint recognition IC 12 can be selectively coupled to at least one of the corresponding sensing electrodes 211~22m through the selection switches. The sensing electrodes 211~22m are arranged in two rows and the number of the shielding electrodes 41~42 in this embodiment is two, namely, the first shielding electrode 41 and the second shielding electrode 42, which respectively cover (shield) the traces 311~31m connected between the fingerprint recognition IC 12 and the sensing electrodes 211~21m, and the traces 321~32m connected between the fingerprint recognition IC 12 and the sensing electrodes 221~22m. Moreover, the biometric recognition apparatus 100 further comprises at least one positioning electrodes 51~5n to sense the position, speed and acceleration of the swiped finger. The shielding electrodes 41~42 shown in FIG. 2 can also be electrically coupled to the fingerprint recognition IC 12 through other traces 410, 420 and are biased by the fingerprint recognition IC 12 to provide better shielding effect. Moreover, the shielding electrodes 41~42, which are electrically coupled to the fingerprint recognition IC 12, can also be used for position and speed measurement of the swiped finger alone or together with the positioning electrodes 51~5n.

Figure 3:
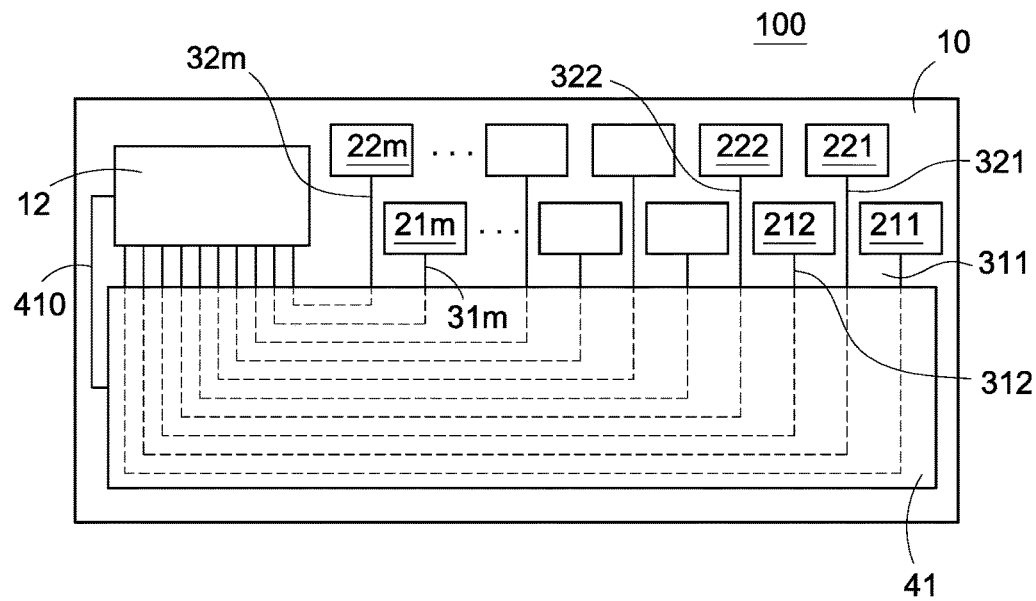

The second embodiment shown in FIG. 3 also has two rows of sensing electrodes 211~22m. However, the traces 311~32m thereof are arranged on single side of the rows of sensing electrodes 211~22m and are corresponding to the first shielding electrode 41. Namely, the number of the shielding electrode in this embodiment is one, where the first shielding electrode 41 shields the traces 311~322m between the fingerprint recognition IC 12 and the sensing electrodes 211~22m. In this embodiment, the biometric recognition apparatus 100 does not have the positioning electrodes 51~5n in the first embodiment. Therefore, the first shielding electrode 41, which is electrically coupled to the fingerprint recognition IC 12 through the trace 410, can replace the positioning electrodes 51~5n to sense the charge change due to the approaching or swiping of user finger or to sense the acceleration of user finger.

Figure 4:
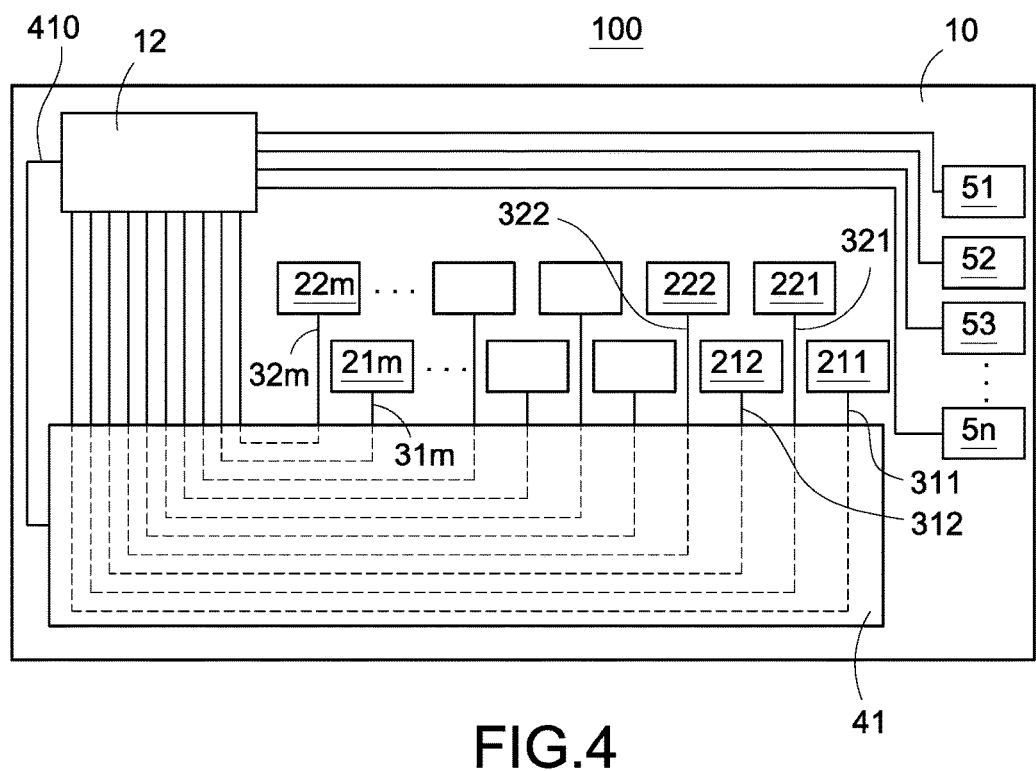

The third embodiment shown in FIG. 4 is similar to that shown in FIG. 3 except that the biometric recognition apparatus 100 further comprises a plurality of positioning electrodes 51~5n. Moreover, the third embodiment shown in FIG. 4 is different with the first embodiment in that the positioning electrodes 51~5n have different location than that of the first embodiment. More particularly, the positioning electrodes 51~5n in FIG. 4 are arranged on the right side while the positioning electrodes 51~5n in FIG. 2 are arranged on the top side. Similarly, the positioning electrodes 51~5n in FIG. 4 also can sense the position, speed and acceleration of the swiped finger.

Figure 5:
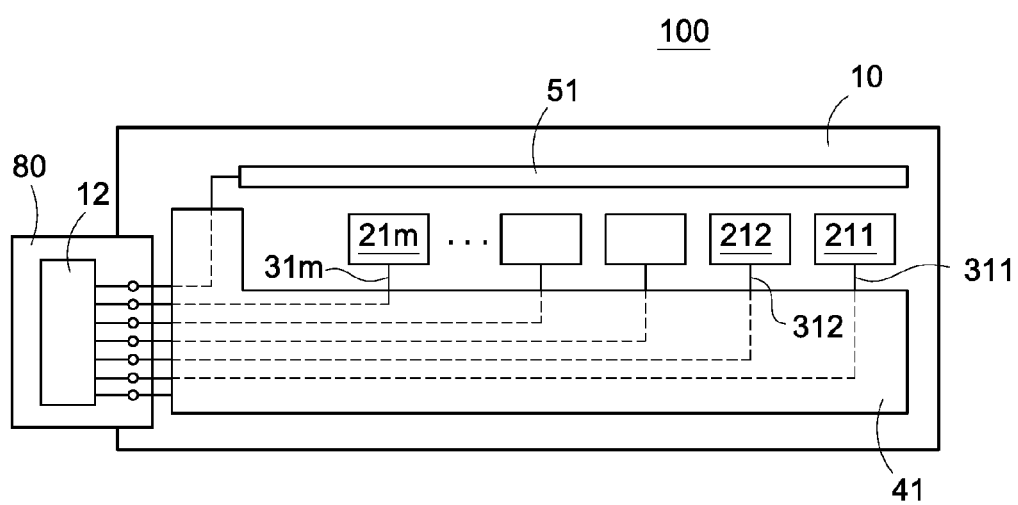

The fourth embodiment shown in FIG. 5 is different with the first embodiment in that the fingerprint recognition IC 12 is bonded or press-welded to a flexible printed circuit board 80 and is electrically connected with the sensing electrodes 211~22m through the trace on the flexible printed circuit board 80 and the traces 311~32m on the substrate 10, and is electrically connected with the shielding electrodes 41, 42 through the trace on the flexible printed circuit board 80 and the other traces on the substrate 10.

Figure 6A:
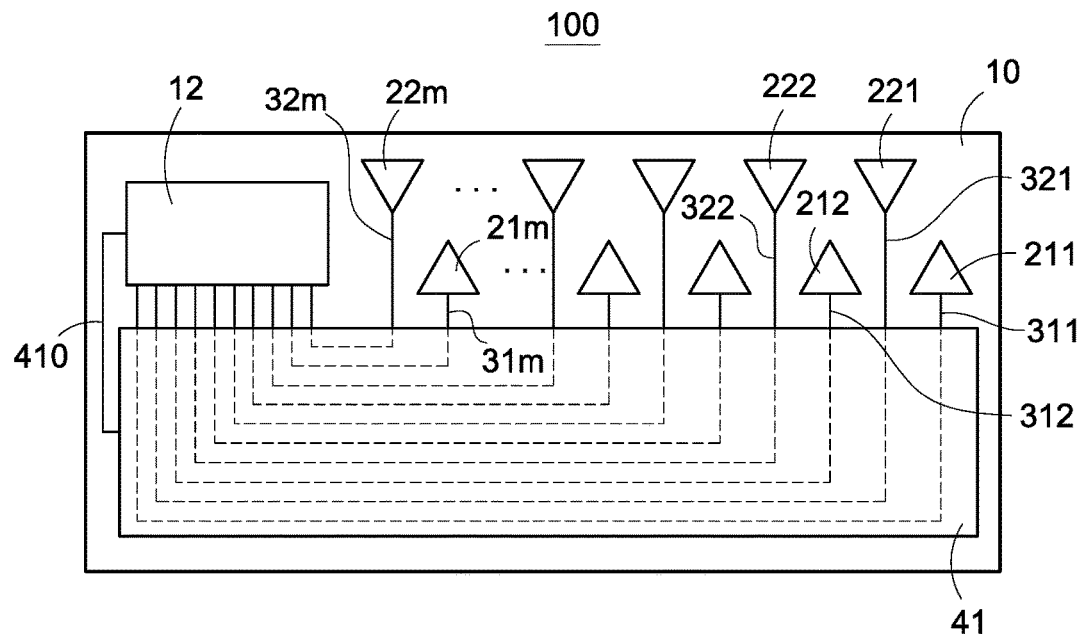
FIGS. 6A to 6C respectively show the example of the sensing electrodes according to first to third embodiments of the sensing electrodes in the present invention.
Figure 6B:
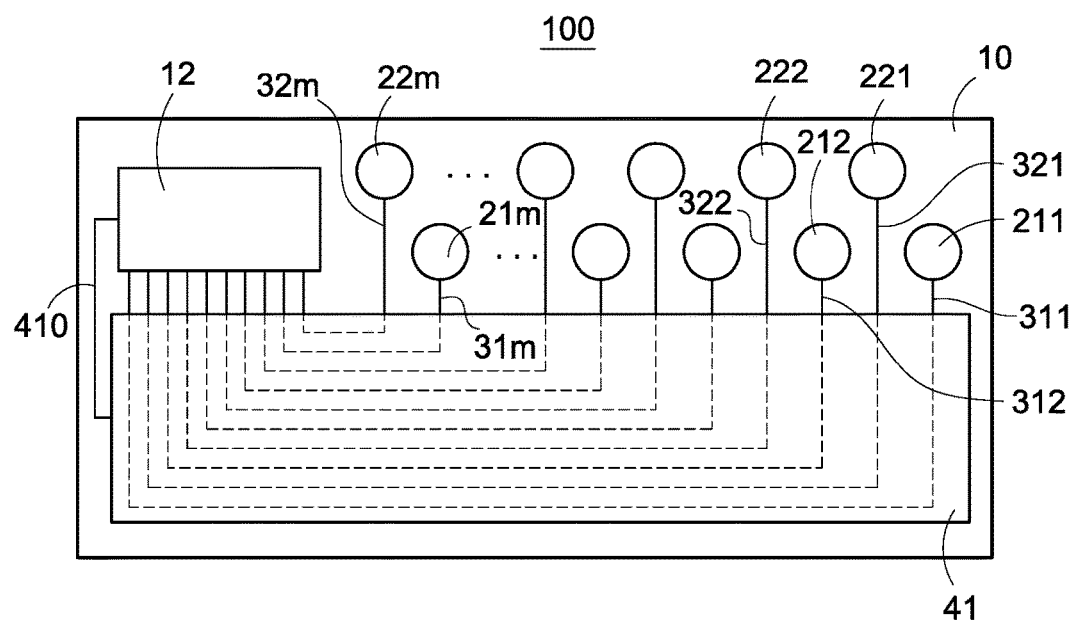
Figure 6C:
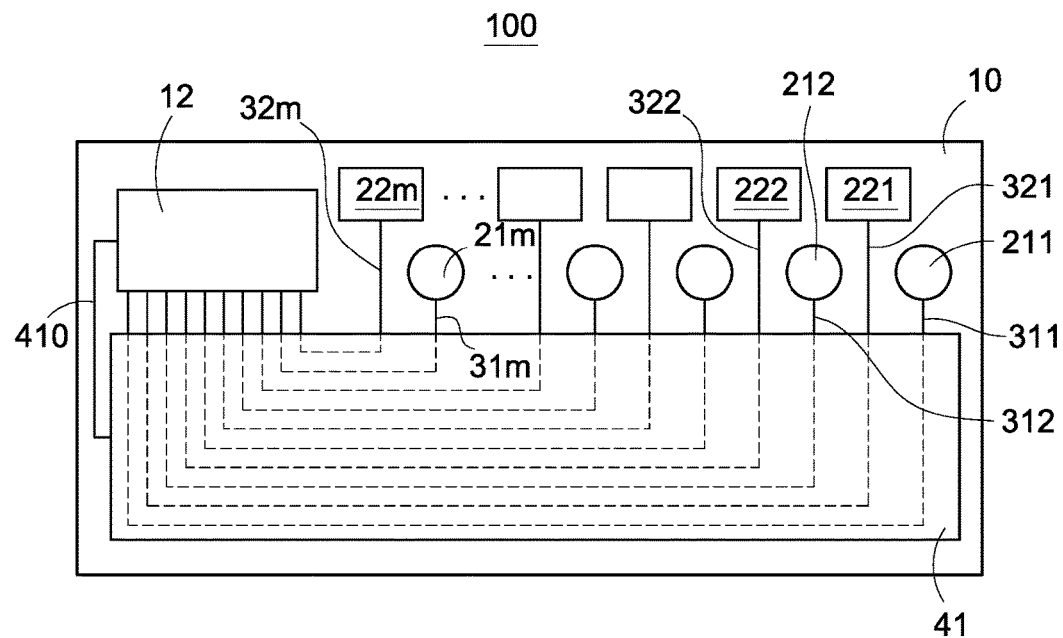

FIGS. 6A to 6C respectively show the example of the sensing electrodes according to first to third embodiments of the sensing electrodes in the present invention. While the shape of the sensing electrodes is exemplified as rectangular in previous example, the sensing electrodes can be other or arbitrarily geometric shapes such as triangular, square, rhombic, circular or polygonal. The sensing electrodes shown in FIG. 6A are triangular, and the sensing electrodes shown in FIG. 6B are circular. Moreover, the shapes of the sensing electrodes in different rows can be different. As shown in FIG. 6C, one row of sensing electrodes are rectangular while the other one row of sensing electrodes are circular. Moreover, the sensing electrodes in adjacent rows can be aligned to each other (as shown in FIG. 2) or staggered with each other (as shown in FIG. 3).

Figure 7:
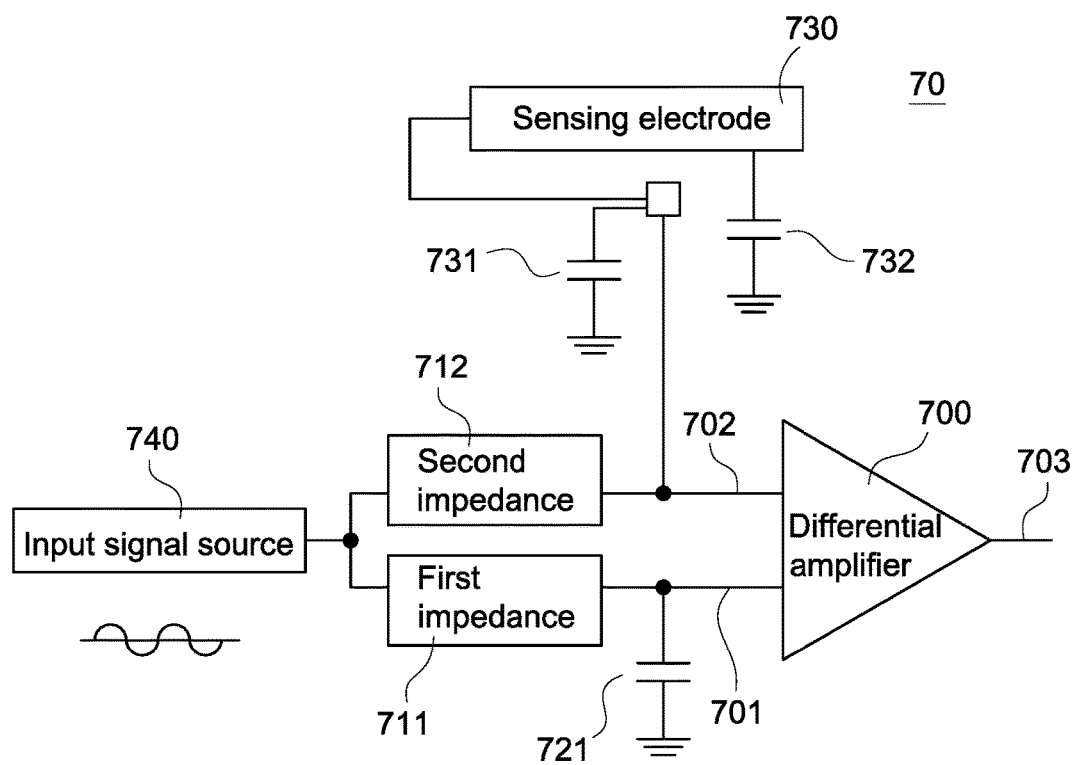
FIG. 7 shows the circuit diagram of the self-capacitance sensing circuit according to an embodiment of the present invention.

FIG. 7 shows the circuit diagram of the self-capacitance sensing circuit according to an embodiment of the present invention. The self-capacitance sensing circuit 70 mainly comprises a differential amplifier 700, a first impedance 711, a second impedance 712, a first capacitor 721, a sensing electrode 730, and an input signal source 740. The differential amplifier 700 has a first input end 701, a second input end 702 and an output end 703. The first impedance 711 and the first capacitor 721 are electrically coupled with the first input end 701. The second impedance 712 and the sensing electrode 730 are electrically coupled with the second input end 702. The input signal source 740 is electrically coupled with the first impedance 711 and the second impedance 712 to provide an input signal to the first impedance 711 and the second impedance 712. The "electrically coupled" means electric connection through metal wire or element with specific impedance, where the element can be resistor, capacitor, inductor or the combination thereof. The input signal is a periodic signal, aperiodic (non-periodic) signal, symmetric signal or asymmetric signal.

In this embodiment, the sensing electrode 730 is electrically connected to the second input end 702 through an IC pin, where the IC pin has a first stray capacitance 731 and the sensing electrode 730 has a second stray capacitance 732. It should be noted the first impedance 711 and the second impedance 712 may have the same impedance value. The capacitance of the first capacitor 721 is equal to the resulting capacitance of the first stray capacitance 731 in parallel connection with the second stray capacitance 732. The input signal source 740 has symmetric circuits for upper and lower branches such that the differentially-amplified signal is zero. The input signal source 740 provides an input signal, which is a periodic signal, aperiodic (non-periodic) signal, symmetric signal or asymmetric signal. The periodic signal can be, for example but not limited to, sinusoidal-wave signal, square-wave signal or triangular-wave signal.

In this embodiment, the capacitance of the first capacitor 721 is equal to the resulting capacitance of the first stray capacitance 731 in parallel connection with the second stray capacitance 732. The capacitance of the second stray capacitance 732 changes when user finger approaches or touches the sensing electrode 730. Therefore, the phase and the amplitude of the signal fed to the second input end 702 also changes such that the differential amplifier 700 has a (non-zero) differential output at the output end 703. In this way, the minute capacitance change on the sensing electrode 730 can be detected by the differential amplifier 700.

Figure 8A:
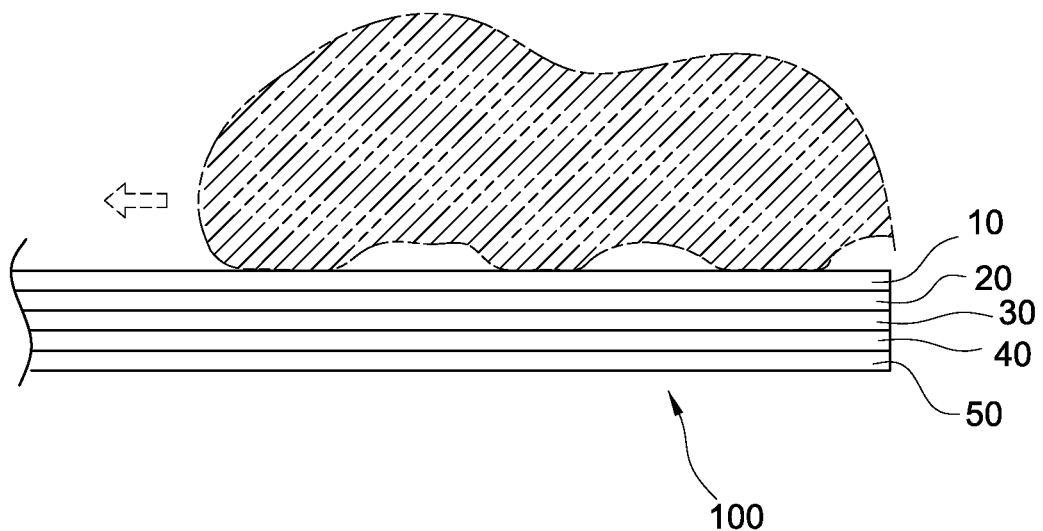
FIGS. 8A to 8C respective show the front view for the layered structure of the biometric recognition apparatus according to three different embodiments of the present invention.
Figure 8B:
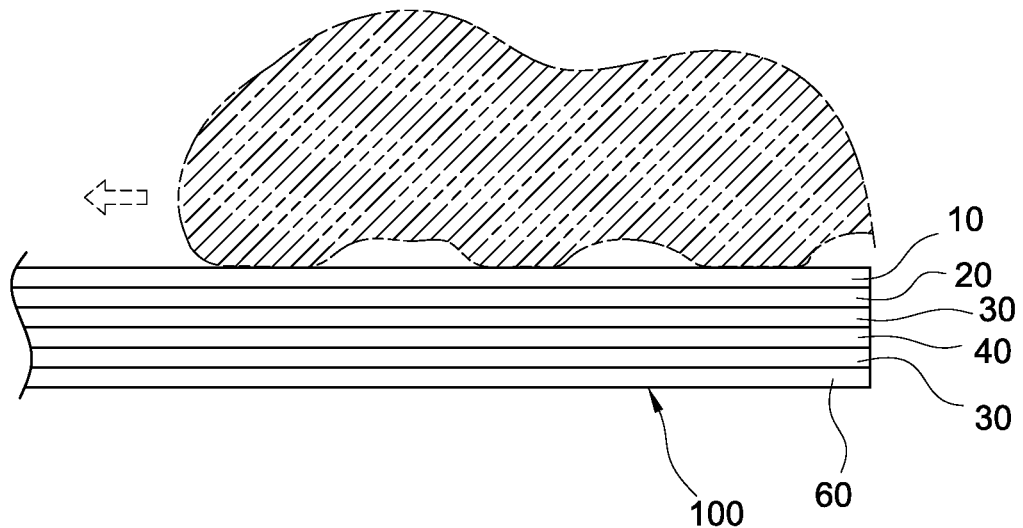
Figure 8C:
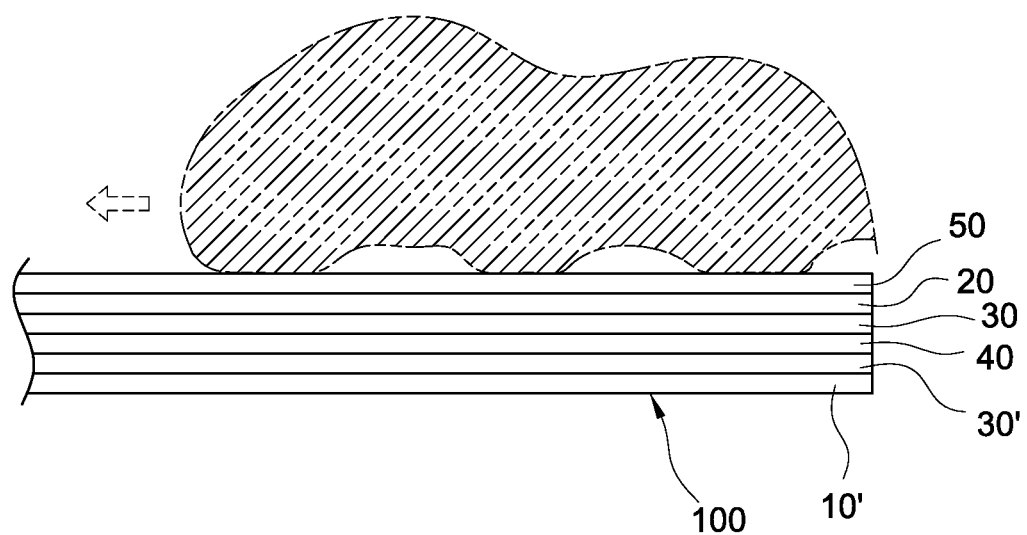

FIGS. 8A to 8C respective show the front view for the layered structure of the biometric recognition apparatus 100 according to three different embodiments of the present invention. The biometric recognition apparatus 100 shown in FIG. 8A comprises, from top (closest to user finger) to bottom direction, a substrate 10, an electrode layer 20, an insulating layer 30, a wiring layer 40 and a protection layer 50. In this embodiment, the substrate 10 is, for example, a non-conducting substrate. The electrode layer 20 comprises the sensing electrodes, the shielding electrodes and the positioning electrodes such as the sensing electrodes 211~22m, the shielding electrodes 41, 42 and the positioning electrodes 51~5n shown in FIG. 2. Moreover, the electrode layer 20 is preferably ranked as second layer counted from the top direction. The ridges and valleys on the fingerprint have only tiny separation and are difficult to sense. Therefore, the electrode layer 20 is preferably close to user finger to enhance sensing accuracy. The insulating layer 30 provides electric isolation between the electrode layer 20 and the wiring layer 40. The protection layer 50 protects the biometric recognition apparatus 100 from oxidation and moisture.

The biometric recognition apparatus 100 shown in FIG. 8B comprises, from top (closest to user finger) to bottom direction, the substrate 10, the electrode layer 20, the insulating layer 30, the wiring layer 40, another insulating layer 30' and a shielding layer 60. Similarly, the substrate 10 is, for example, a non-conducting substrate. The electrode layer 20 comprises the sensing electrodes, the shielding electrodes and the positioning electrodes. The insulating layer 30 provides electric isolation between the electrode layer 20 and the wiring layer 40. The insulating layer 30' provides electric isolation between the wiring layer 40 and the shielding layer 60. In this embodiment, the shielding layer 60 is provided to enhance the immunity of noise and interference for the traces and the sensing electrodes.

The biometric recognition apparatus 100 shown in FIG. 8C comprises, from top (closest to user finger) to bottom direction, the protection layer 50, the sensing electrode layer 20, the insulating layer 30, the wiring layer 40, the other insulating layer 30' and the substrate 10'. In this embodiment, the substrate 10' is a metallic substrate 10'. Furthermore, the metal can be stainless steel, aluminum (Al), copper (Cu), titanium (Ti), tungsten (W), silver (Ag), tin (Sn), iron (Fe) or the alloy of above metals, or liquid alloy. Due to the conductivity of the metallic substrate 10', the other insulating layer 30' is provided between the wiring layer 40 and the substrate 10' for electric isolation therebetween. The protection layer 50 protects the biometric recognition apparatus 100 from oxidation, moisture and scratch. The metallic substrate 10' can also provide shielding effect for noise. Moreover the biometric recognition apparatus 100 can be realized by layered structure other than those shown in FIGS. 8A to 8C as long as intended purpose can be achieved.

To sum up, the present invention has following advantages:

1. The biometric recognition apparatus can be implemented by layered structure directly arranged on thin film substrate and no further packaging process is involved, thus reducing cost and simplifying process.

2. The biometric recognition apparatus has one or more than more row of sensing electrode, shielding electrode for providing shielding effect and a high-performance self-capacitance sensing circuit. The cost is reduced while the fingerprint imaging has better accuracy and the product lifetime/durability can be enhanced.

3. The biometric recognition apparatus has at least one shielding electrode to sense charge change due to the approaching or swiping of user finger or to sense the acceleration of user finger. The sensing elements can be simplified to further size down the biometric recognition apparatus.

Thus, particular embodiments have been described. Other embodiments are within the scope of the following claims. For example, the actions recited in the claims may be performed in a different order and still achieve desirable results.

What is claimed is:

1. A biometric recognition apparatus, comprising:
 a substrate;
 a plurality of sensing electrodes arranged on one side of the substrate and arranged in at least one row to sense fingerprint information of user finger thereon;
 a plurality of traces, each of the traces electrically coupled to at least one of the sensing electrodes;
 at least one shielding electrode arranged on one side of the traces to shield the traces from interference of noise;
 at least one insulating layer arranged between the shielding electrode and the traces, and
 at least one fingerprint recognition integrated circuit (IC) comprising at least one self-capacitance sensing circuit, the self-capacitance sensing circuit selectively coupled to at least one of the sensing electrodes to sense charge variation or capacitance variation of the selected sensing electrode due to approaching, touching or swiping of user finger.

2. The biometric recognition apparatus in claim 1, further comprising a positioning electrode to sense an approach, or a position of user finger or a speed or an acceleration of swiped user finger.

3. The biometric recognition apparatus in claim 2, wherein the traces are arranged on a wiring layer, and the insulating layer is arranged between the positioning electrode and the wiring layer.

4. The biometric recognition apparatus in claim 1, wherein the at least one shielding electrode is electrically connected to the at least one fingerprint recognition IC to sense an approach or a position of user finger or to sense a speed or an acceleration of swiped user finger.

5. The biometric recognition apparatus in claim 1, wherein the self-capacitance sensing circuit comprises:
 a differential amplifier having a first input end, a second input end and an output end;
 a first impedance electrically coupled to the first input end;
 a second impedance electrically coupled to the second input end and having a same impedance with the first impedance;
 a first capacitor electrically coupled to the first input end; and
 an input signal source electrically coupled to the first input end and the second input end and proving an input signal,
 wherein at least one of the sensing electrodes is electrically coupled to the second input end to sense a fingerprint information, the differential amplifier outputs a differentially-amplified signal according to the input signal and the sensed fingerprint information.

6. The biometric recognition apparatus in claim 1, wherein the at least one fingerprint recognition IC is bonded or press-welded on the substrate and electrically coupled to the sensing electrodes and the at least one shielding electrode.

7. The biometric recognition apparatus in claim 1, wherein the at least one fingerprint recognition IC is bonded or press-welded on a flexible printed circuit board is electrically coupled to the sensing electrodes and the at least one shielding electrode through traces on the flexible printed circuit.

8. The biometric recognition apparatus in claim 1, wherein the substrate is glass substrate or polymer thin film substrate.

9. The biometric recognition apparatus in claim 1, wherein the substrate is metallic substrate.

10. The biometric recognition apparatus in claim 9, wherein the metallic substrate is made from stainless steel, aluminum (Al), copper (Cu), iron (Fe), silver (Ag), tin (Sn), tungsten (W) or an alloy of above metals.

11. The biometric recognition apparatus in claim 9, wherein the metallic substrate is isolated with the traces by another insulating layer.

12. The biometric recognition apparatus in claim 9, further comprising a protection layer arranged opposite to the metallic substrate.

13. The biometric recognition apparatus in claim 1, wherein the sensing electrodes and the shielding electrode are made from transparent conductive material or opaque conductive material.

14. The biometric recognition apparatus in claim 13, wherein the transparent conductive material is indium tin oxide (ITO), zinc tin oxide (ZTO), zinc oxide (ZnO), gallium zinc oxide (GZO) conductive polymer, carbon nanotube, graphene, or silver film with thickness below 50 nm.

15. The biometric recognition apparatus in claim 13, wherein the opaque conductive material is chromium (Cr), barium (Ba), molybdenum (Mo), aluminum (Al), silver (Ag), copper (Cu), titanium (Ti), nickel (Ni), tantalum (Ta), cobalt (Co), tungsten (W), magnesium (Mg), calcium (Ca), potassium (K), lithium (Li), indium (In), an alloy of above metals, or a composition of lithium fluoride and Al, or a composition of magnesium fluoride and Al, or a composition of lithium oxide and Al.

16. The biometric recognition apparatus in claim 1, wherein the sensing electrodes are of triangular, rectangle, square, rhombic, circular or polygonal shape.

17. The biometric recognition apparatus in claim 1, wherein the sensing electrodes are arranged in at least two rows, one row of sensing electrodes are aligned with another row of sensing electrodes, or staggered with another row of sensing electrodes.

18. The biometric recognition apparatus in claim 1, wherein each of the traces has narrower width than width of the sensing electrode.

19. The biometric recognition apparatus in claim 1, wherein the traces are arranged on a wiring layer, and the insulating layer is arranged between the sensing electrode and the wiring layer.

20. The biometric recognition apparatus in claim 1, wherein the self-capacitance sensing circuit is configured to send an input signal to a selected one of the sensing electrodes and obtain a sensed signal from the selected one of the sensing electrodes.

\* \* \* \* \*